June 23, 1925. 1,542,934
W. E. GREENAWALT
METALLURGICAL PROCESS
Filed April 6, 1923
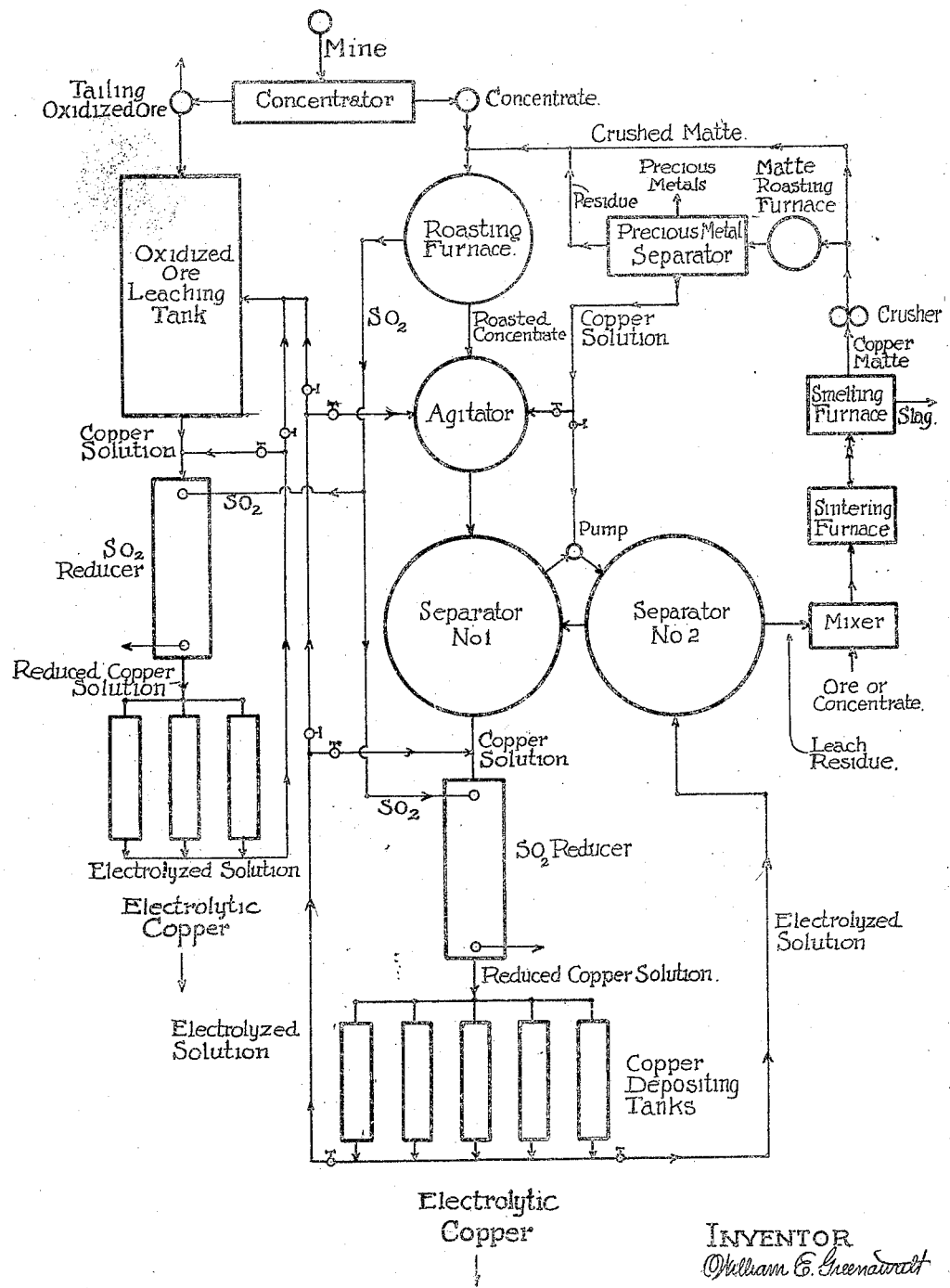
INVENTOR
William E. Greenawalt Patented June 23, 1925.

1,542,934

UNITED STATES PATENT OFFICE.

WILLIAM E. GREENAWALT, OF DENVER, COLORADO.

METALLURGICAL PROCESS.

Application filed April 6, 1923. Serial No. 630,309.

*To all whom it may concern:*

Be it known that I, WILLIAM E. GREENA-WALT, a citizen of the United States, residing in the city and county of Denver and State of Colorado, have invented certain new and useful Improvements in Metallurgical Processes, of which the following is a specification.

The invention is more specifically directed to the extraction of copper from its ores, especially from its ores containing precious metals, by a combination of hydro and pyro metallurgy.

One of the difficulties in leaching high grade copper ore or concentrate is that of obtaining a high extraction, and this difficulty is greatly increased if the ore or concentrate contains precious metal values, and particularly if the precious metal values are distributed between gold and silver. If, for example, a concentrate is treated containing, say, 15% copper, $1.00 in gold, and $1.00 in silver, and an extraction of 92% of the copper is made by roasting and leaching, then, taking shrinkage into account, the residue would assay approximately 2.0%, or 40 lbs., copper, per ton, $1.25 in gold, and $1.25 in silver; or a total metal content of gold, silver and copper of approximately $8.50 per ton estimating copper at 15¢ per pound. The recovery of these widely different values by a solvent process, in so lean a material, would present quite a problem.

On the other hand, by the proposed process of leaching and smelting the difficulty is greatly reduced, and certain incidental advantages are obtained which greatly facilitates the treatment of this class of ore.

In smelting copper ore by the ordinary method, the metallic copper is not the end product, as is well known. The ore is first smelted into matte; this matte is then blown into blister copper, and the blister copper is then refined electrolytically to obtain the copper of commerce and to separate and recover the precious metals, originally contained in the ore. Conversion of the matte, and electrolytic refining are expensive to operate, and certainly very expensive to install. The refining installation is in fact so expensive that very few mining companies do their own refining.

In the present process electrolytic copper and the precious metals are obtainable in their elemental form without either a converting plant or an electrolytic refinery. It also simplifies leaching, since no strenuous effort need be made to get a high recovery in the leaching operation, and the leaching step of the process, both in installation and operation can be greatly simplified. The installation of a smelting furnace, of itself, is not very expensive; the greatest expense is incurred in the accessories. In the present process most of the accessories of smelting are eliminated.

The process may be described by referring to the accompanying drawing, which represents a flow sheet in diagrammatic plan. Ordinarily, the low grade ore, as it comes from the mine, is concentrated, either by gravity, by flotation, or both combined, into a sulphide concentrate. The gangue is wasted. If the ore is partly in the form of oxide the tailing may be leached separately.

In the operation of the process the sulphide concentrate is roasted, preferably by the method set forth in my pending application, Serial No. 485,885, filed July 19, 1921, by means of which from 50% to 75% of the copper can be made soluble in water. The roasted concentrate is then leached with an acid solution to extract the copper. The leaching is preferably done by agitation. The resulting solution is then treated with sulphur dioxide, obtained from roasting the sulphide concentrate, to reduce the ferric salts in the solution to the ferrous condition. The solution is then electrolyzed to deposit the copper as the electrolytic metal with the simultaneous regeneration of the solvent. The cycle of reduction and electrolysis is continued until the solution is sufficiently depleted in copper and regenerated in acid. This regenerated acid solution is then returned to the ore to dissolve the copper not soluble in water. This step of the present process is described in detail in my apparatus Patent No. 1,353,995, Sept. 28, 1920; and in my pending process application, Serial No. 520,241, filed December 6, 1921.

The leach residue, which does not require a high extraction and consequently not a thorough washing, or possibly no washing at all, is then mixed with a combustible, and preferably with enough raw concentrate to provide sufficient sulphur to form a suitable low grade matte. The leached residue, when mixed with the desired amount of dry ore or concentrate, will contain about the right amount of moisture for sintering, which is ordinarily about 10%. It will not be necessary, therefore, to filter the leach residue or to dry it before mixing it with the raw material. The mixture of ore and leach residue is then sintered, and the sinter smelted into matte. This matte contains, in a comparatively small bulk, all the residual values, with a high percentage of recovery and a resulting very lean slag, and with a high ratio of concentration.

Where the matte is of comparatively low grade, a high recovery, and consequently an extremely lean slag is possible, as well as a high rate of smelting. If, for example, the original raw concentrate assays 15.0% copper, and the slag 0.2%, a recovery of approximately 98.7% of the copper is indicated, and consequently also of the precious metals. If the matte is maintained at 30.0% copper, which is not a very high grade, a concentration of about 15 into 1 can be made of the leach residue. This would give a matte containing also about $35.00 in gold and silver. Such a matte would be of entirely too low a grade to warrant special treatment for the recovery of the precious metals. The matte is crushed to about the same fineness as the concentrate, and is then mixed with the raw concentrate, and the mixture forms a new charge. The mixture will have approximately 16.2% copper and about $4.00 in gold and silver. The mixture is then roasted and leached and the residue smelted as described. The resulting matte will assay about 30.0% copper and about $70.00 in gold and silver. The matte is again crushed and mixed with a new concentrate charge. The mixture will assay about 16.2% copper, as before, but the precious metal value will assay about $6.00. This is passed through another cycle, as described, and the resulting matte will assay about 30.0% copper and about $105.00 in gold and silver. In this way the precious metal values in the matte are built up to any extent desired, and with a recovery of about 98.7% of the copper and precious metals, without any special treatment, and the gangue of the concentrate is eliminated as a low grade slag, assaying about 0.2% copper. When the matte is sufficiently built up on the precious metals, it is withdrawn from the circuit, and either shipped, or given a special treatment; by crushing the matte, roasting it in a small separate furnace, and leaching the matte separately to extract the copper, and then treating the leached matte residue to recover the precious metals in metallic form by any of the well known methods, such as amalgamation, chlorination, or cyanidation, or a combination of these methods. The resulting copper solution from leaching the matte to extract the copper is added to the regular copper solution and will not require any further care. The matte residue is also added to a new charge of concentrate and hence no attempt need be made to get a low grade tailing of the matte, and hence no great refinement is required in the treatment of the matte.

It will be observed that in this method of treatment all the metals are recovered in metallic form and in a merchantable condition, and with an exceptional high percentage of recovery, without the use of a converting or refining plant, and also without any special refinement in the leaching of the concentrate or expense in the leaching installation.

The smelting is also greatly cheapened. If, for example, the concentrate were smelted direct, as in a reverberatory furnace, the concentrate would have to be roasted, as in leaching, although not as carefully. If a 45% copper matte is made the ratio of concentration would be only 3 into 1, both for the copper and the precious metals, and with a matte so high in copper, the slag would be correspondingly high, and considerable care would be required to avoid excessive loss in the slag. The matte, containing 45% copper and about $6.00 in gold and silver, would be nothing more than a concentrated product, and would still have to be shipped, converted and refined to get the metals in merchantable form.

By the present process the matte can be built up in precious metals to any extent desired, or say up to about $500.00 in gold and silver, per ton, for a 30% copper matte, and if the matte is concentrated to 45% copper, the gold and silver value would be about $625.00. This would mean a comparatively very small installation for the recovery of the precious metal values in metallic form.

It is evident that by the present process, the step of leaching is greatly simplified. A high extraction, by leaching, is not necessary, since the residual copper is recovered in the smelting. In ordinary processes of leaching, washing of the ore or residue to remove practically all the soluble copper, is quite a tedious and expensive operation, and in some cases, where the copper is electrolytically precipitated, fully 25% of the copper from waste foul solutions and from wash waters, is precipitated chemically, with scrap iron, to make the electrolytic deposition practical. By the present process all this would be avoided, or practically so, since there would be no object in removing even a large portion of the soluble copper, with barren wash water, from the acid leach residue.

Evidently, therefore, both the leaching and the smelting are greatly cheapened and simplified.

The sulphur dioxide, from roasting the sulphide concentrate, is used to advantage in reducing the ferric salts formed by the electrolysis. Under these conditions, about 3.0 lbs. of acid are regenerated, per pound of copper deposited, and this would make the process self sustaining in acid, and this is an important consideration, in the production of cheap copper.

In sintering, the material to be sintered should contain about 10% moisture and enough combustible to create enough heat for partial fusion. This combustible may be coal or coke, but is preferably a sufficient amount of sulphide ore or concentrate to give enough heat to sinter the mixture and to provide enough sulphur to give a desirable matte. Sulphide ore may also be added to the smelting furnace. Under these conditions of sintering it will not be necessary to dry the leach residue, but the leach residue may be taken as it is drained from the separator and mixed with sufficient dry ore or concentrate, and partly sintered material from a previous sinter charge, to give the desired moisture for sintering, or about 10%. A suitable apparatus for sintering the mixture of leach residue and raw ore preparatory to smelting is described in detail in Patents No. 1,348,407, Aug. 3, 1920, and No. 1,388,335, Aug. 23, 1921. A mixture containing about 10% moisture and from 8% to 12% sulphur gives an excellent sinter. If the sulphur content is low, a little carbonaceous fuel, such as coal, charcoal, or coke, may be added.

Most copper deposits contain mixed sulphide and oxide ore. In such cases, the concentrator tailings, instead of being wasted, are leached to recover the copper in the ore in the form of oxide. The excess acid from treating the sulphide concentrate is used to leach the oxide tailings, and the sulphur dioxide from the roasting of the sulphide concentrate is used to reduce the ferric salts formed by depositing the copper from the leach solution from the oxide concentrator tailings.

It will be seen from the accompanying flow sheet that the copper solution may flow in a closed circuit between the $SO_2$ reducer and the cells or copper depositing tanks, while a portion of the electrolyzed and regenerated solution is flowed progressively through the entire system.

It will be understood, for the purpose of this invention, that it does not make any difference whether the matte is roasted with the sulphide concentrate, or roasted separately and then added. For convenience preference is given to the first method, altho metallurgically they are equivalents.

The degree of impoverishment of copper solutions by electrolysis, as also the amount of copper extracted in the various steps of the process is optional with the operator. When he thinks the copper is sufficiently removed in one step he will proceed with the next. This will naturally vary with the operator and with the nature of the material being treated.

I claim:

1. A process of treating copper ores comprising, concentrating the ore into a sulphide concentrate, roasting the concentrate, leaching the concentrate to extract a portion of the copper, then smelting the leached concentrate residue to get the remainder of the copper into a matte, crushing the matte, adding the crushed matte to a new sulphide concentrate charge and repeating the cycle.

2. A process of treating copper ore containing precious metals comprising, concentrating the ore into a sulphide concentrate, roasting the concentrate, leaching the roasted concentrate to extract a portion of the copper, then smelting the leached concentrate to get the remainder of the copper and the precious metals into a matte, crushing the matte, adding the crushed matte to a new concentrate charge and repeating the cycle.

3. A process of treating copper ore containing precious metals comprising, treating the ore to form a concentrate, roasting the concentrate, leaching the roasted concentrate to extract a portion of the copper, then smelting the leached concentrate residue to get the remainder of the copper and the precious metals into a matte, crushing the matte, adding the crushed matte to a new concentrate charge, and repeating the cycle until the matte becomes sufficiently enriched in the precious metals, and then recovering the precious metals from the matte.

4. A process of treating copper ore comprising, concentrating the ore into a sulphide concentrate, roasting the concentrate, leaching the roasted concentrate, electrolyzing the leach solution to obtain the electrolytic copper and regenerate the solution, returning the regenerated solution to the leaching tank and repeating the cycle until the copper is sufficiently extracted, then smelting the leached residue to obtain the residual values in a matte, crushing the matte and adding the matte to a new charge of sulphide concentrate.

5. A process of treating copper ore comprising, concentrating the ore into a sulphide concentrate, roasting the concentrate, leaching the roasted concentrate, electrolyzing the leach solution to deposit the copper and regenerate acid, applying sulphur dioxide from the roasting furnace to the electrolyzed solution and repeating the cycle of reduction and electrolysis until the copper solution is sufficiently depleted in copper and regenerated in acid and then returning the regenerated acid solution to the concentrate and continuing the cycle until the copper in the roasted concentrate is sufficiently extracted, then smelting the leached residue to get the remaining values in a matte, crushing the matte, and adding the crushed matte to a new charge of concentrate.

6. A process of treating copper ore containing precious metals comprising, concentrating the ore into a sulphide concentrate, roasting the concentrate, leaching the roasted concentrate, electrolyzing the leach solution to deposit the copper and regenerate acid, applying sulphur dioxide from the roasting furnace to the electrolyzed solution and repeating the cycle of reduction and electrolysis until the copper solution is sufficiently depleted in copper and regenerated in acid and then returning the regenerated acid solution to the concentrate and repeating the cycle until the copper in the roasted concentrate is sufficiently extracted, then smelting the leached concentrate residue to get the residual values in a matte, crushing the matte, and adding the crushed matte to a new concentrate charge and repeating the cycle until the matte becomes sufficiently enriched in the precious metals, and then recovering the precious metals from the matte.

7. A process of treating copper ore containing precious metals comprising, roasting the crushed ore, leaching the roasted ore to extract a portion of the copper, then smelting the leached residue to get the residual values in a matte, crushing the matte, adding the crushed matte to a new ore charge and repeating the cycle until the matte becomes sufficiently enriched in precious metals, then crushing the high grade matte, roasting the matte in a separate furnace, leaching the matte, adding the leach copper solution to the leach solution from the roasted ore, electrolyzing the combined solution to deposit the copper as the electrolytic metal, recovering the precious metals from the leached matte, and adding the leached matte to a new ore charge.

8. A process of treating copper ore comprising, treating the ore to obtain a sulphide concentrate and an oxide tailing, roasting the concentrate, leaching the roasted concentrate, applying sulphur dioxide from the roasting furnace to the leach solution, electrolyzing the leach solution to deposit the copper and regenerate acid, returning a portion of the regenerated acid solution to the concentrate and applying a portion to the oxide tailing and continuing the operation until the copper in the concentrate is sufficiently extracted, then smelting the leached concentrate residue to get the residual values in a matte, crushing the matte and adding the matte to a new concentrate charge.

9. A process of treating copper ore comprising, roasting the ore, leaching the roasted ore to extract a portion of the copper, smelting the leached residue to get the remainder of the copper in a matte, and adding the matte to a new ore charge.

10. A process of treating copper ore comprising, roasting the ore, leaching the roasted ore to extract a portion of the copper, mixing a combustible and dry ore to the wet leached ore residue to form a suitable sintering mixture, sintering the mixture and smelting the sinter to obtain the residual values in the leached residue in a matte, and adding the matte to a new ore charge.

11. A process of treating copper ore containing precious metals comprising, leaching the ore to extract a portion of the copper, smelting the leached residue to get the remainder of the copper and the precious metals in a matte, adding the matte to a new ore charge and repeating the cycle until the matte is sufficiently enriched in the precious metals, then treating the enriched matte to recover the precious metals therefrom, and adding the treated matte residue to a new ore charge.

12. A process of treating copper ore or concentrate containing precious metals comprising, roasting the ore, leaching the roasted ore to extract a portion of the copper, then mixing the undried leached residue still containing both soluble and insoluble copper with other material to be smelted, sintering the mixture, smelting the sinter to recover the remaining values of the leached residue in a matte, crushing the matte, and adding the crushed matte to a new ore charge, roasting the mixture, and repeating the cycle to accumulate the precious metals in a high grade matte.

13. A process of treating oxide ores of copper and sulphide ores of copper containing precious metals comprising, roasting the sulphide ore, leaching the roasted ore to extract a portion of the copper, electrolyzing the leach solution to deposit the copper and regenerate acid and ferric salts, applying sulphur dioxide to the electrolyzed solution as a reducing agent and repeating the cycle of reduction and electrolysis until the solution is sufficiently depleted in copper and regenerated in acid and then returning the regenerated acid solution to the roasted ore and continuing the cycle until the copper in the roasted ore is sufficiently extracted, then smelting the leached residue to get the remaining values in a matte, crushing the matte, adding the crushed matte to a new ore charge for the roasting furnace, and continuing the cycle of roasting and leaching of the ore and matte whereby excess acid is produced by the electrolysis of the leach solution and applying the excess acid so produced to extract copper from the oxide ore.

14. A process of treating ores of copper containing precious metals comprising, concentrating the ore into a sulphide concentrate, smelting the concentrate into a matte containing the copper and precious metals, crushing the matte, roasting the crushed matte, leaching the roasted material to extract some of the copper, electrolyzing the resulting solution to deposit the copper and regenerate acid, returning the regenerated acid solution to the roasted material and continuing the cycle of leaching and electrolysis of the leach solution until the copper in the roasted material is sufficiently extracted, then adding the leach residue to a new ore charge and smelting the mixture and continuing the cycle of smelting, matte roasting, and leaching until the precious metals are sufficiently concentrated in an enriched matte, and then recovering the copper and precious metals from the enriched matte.

15. A process of treating ores of copper containing precious metals comprising, smelting the ore into a matte containing the copper and precious metals, crushing the matte, roasting the crushed matte, leaching the roasted material to extract some of the copper, electrolyzing the resulting solution to deposit the copper and regenerate acid, returning the regenerated acid solution to the roasted material and continuing the cycle of leaching and electrolysis of the leach solution until the copper in the roasted material is sufficiently extracted, then adding the leach residue containing the precious metals and residual copper to a new ore charge and smelting the mixture and continuing the cycle of smelting, matte roasting, and leaching until the precious metals are sufficiently concentrated in an enriched matte, then recovering some of the precious metal and copper values from the enriched matte, and then adding the resulting matte leach residue to a new smelter charge.

WILLIAM E. GREENAWALT.